United States Patent
Buch et al.

(10) Patent No.: US 9,508,361 B2
(45) Date of Patent: Nov. 29, 2016

(54) CHANNEL APPARATUS FOR TRANSMITTING MULTIPLE DIFFERENTIAL SIGNALS

(71) Applicant: Seagate Technology LLC, Cupertino, CA (US)

(72) Inventors: Bruce Buch, Westborough, MA (US); Stefan A. Ionescu, Burnsville, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 14/636,018

(22) Filed: Mar. 2, 2015

(65) Prior Publication Data

US 2016/0260446 A1    Sep. 8, 2016

(51) Int. Cl.
*G11B 5/09*    (2006.01)

(52) U.S. Cl.
CPC ........................................ *G11B 5/09* (2013.01)

(58) Field of Classification Search
CPC ........... G11B 5/02; G11B 5/012; G11B 5/40; G11B 27/36; G11B 2005/0016; G11B 20/10009
USPC ............. 360/66, 46, 67, 234.5, 245.9, 264.2
See application file for complete search history.

(56) References Cited

U.S. PATENT DOCUMENTS

| | | |
|---|---|---|
| 5,432,476 A | 7/1995 | Tran |
| 6,195,230 B1 | 2/2001 | O'Connor |
| 6,538,832 B1 | 3/2003 | Ranmuthu et al. |
| 6,735,030 B2 | 5/2004 | Ngo et al. |
| 6,873,210 B2 | 3/2005 | Mulder et al. |
| 7,477,467 B1 | 1/2009 | Sutardja |
| 8,988,829 B1 * | 3/2015 | Contreras ............. G11B 5/486 360/234.5 |
| 2011/0280238 A1 | 11/2011 | Kreuzer et al. |

* cited by examiner

*Primary Examiner* — Nabil Hindi
(74) *Attorney, Agent, or Firm* — Mueting, Raasch & Gebhardt, P.A.

(57) ABSTRACT

Transmission signals may generated based on three differential signals and transmitted along a channel. Each of the plurality of transmission signals may include a signal representative of each of the three differential signals. After receiving the transmission signals, the original three differential signals may be generated based on the transmission signals.

20 Claims, 10 Drawing Sheets

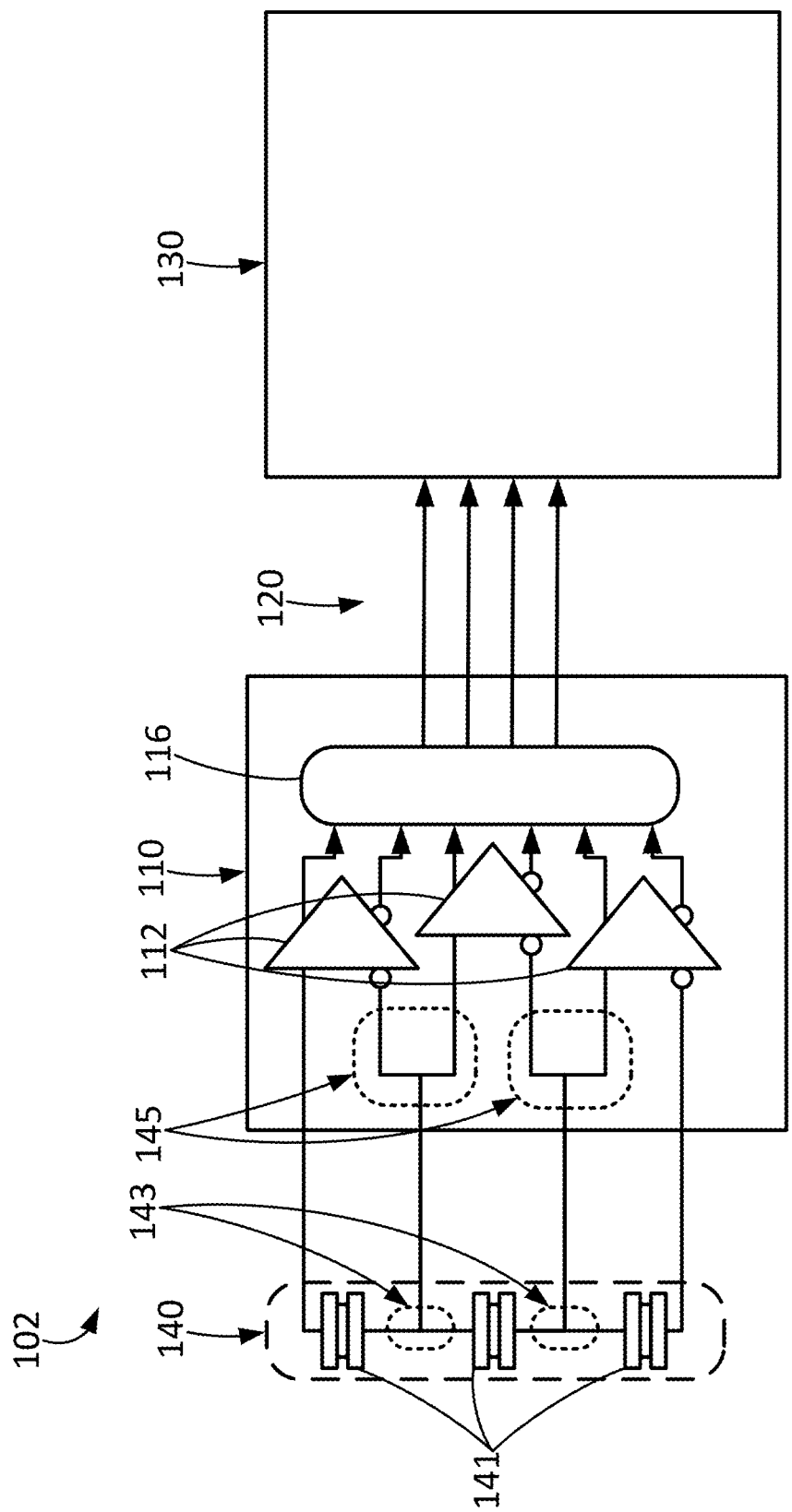

_(US 9,508,361 B2)_

CHANNEL APPARATUS FOR TRANSMITTING MULTIPLE DIFFERENTIAL SIGNALS

The disclosure herein relates to transmitting multiple differentials signals over a channel within an electronic device including, e.g., a storage device (e.g., a hard disk drive, etc.).

SUMMARY

The present disclosure relates to transmitting multiple differential signals over a channel (e.g., multiple conductors, a read path including a pair of conductors, a write path include a pair of conductors, four total conductors, conductive traces on a flexible circuit, etc.) between a preamplifier and a read channel portion of a storage device (e.g., a hard disk drive, etc.). In at least one embodiment, a preamplifier may receive three differential signals (e.g., each corresponding to a different read transducer of a single head, one differential signal for each different read transducer, etc.) and generate four transmission signals, each including a signal representative of each of the three differential signals, for transmitting over a four conductors to a read channel portion (e.g., a portion or function of a controller, etc.).

An exemplary apparatus may include a preamplifier and a read channel portion (e.g., a part, portion, or function of a controller including write channel portion, etc.). The preamplifier may be configured to generate a plurality of transmission signals such as, e.g., four transmission signals, for transmission over a plurality of conductors such as, e.g., four conductors, based on at least three differential signals. Each of the plurality of transmission signals may include a signal representative of each of the at least three differential signals. The read channel portion may be configured to receive the plurality of transmission signals over the plurality of conductors and generate the at least three differential signals based on the plurality of transmission signals.

An exemplary method to transmit at least three differentials signals over a plurality of conductors may include generating a plurality of transmission signals such as, e.g., four transmission signals, for transmission over a plurality of conductors such as, e.g., four conductors, based on at least three differential signals. Each of the plurality of transmission signals may include a signal representative of each of the at least three differential signals. The exemplary method may further include receiving the plurality of transmission signals over the plurality of conductors and generating the at least three differential signals based on the plurality of transmission signals.

Another exemplary system may include a preamplifier configured to receive three differential signals and generate intermediate signals for each of the three differential signals. Each intermediate signal may define a current proportional to the voltage difference of the differential signal. The preamplifier may be further configured to selectively combine the intermediate signals to generate four transmission signals for transmission over four conductors where each of the plurality of transmission signals including a signal representative of each of the three differential signals.

The above summary is not intended to describe each embodiment or every implementation of the present disclosure. A more complete understanding will become apparent and appreciated by referring to the following detailed description and claims taken in conjunction with the accompanying drawings. In other words, these and various other features and advantages will be apparent from a reading of the following detailed description.

BRIEF DESCRIPTION OF THE DRAWINGS

The disclosure may be more completely understood in consideration of the following detailed description of various embodiments of the disclosure in connection with the accompanying drawings.

FIG. 10 is a schematic diagram of another exemplary apparatus for use in transmitting multiple differential signals including shared shield read transducers.

DETAILED DESCRIPTION

Figure 1:
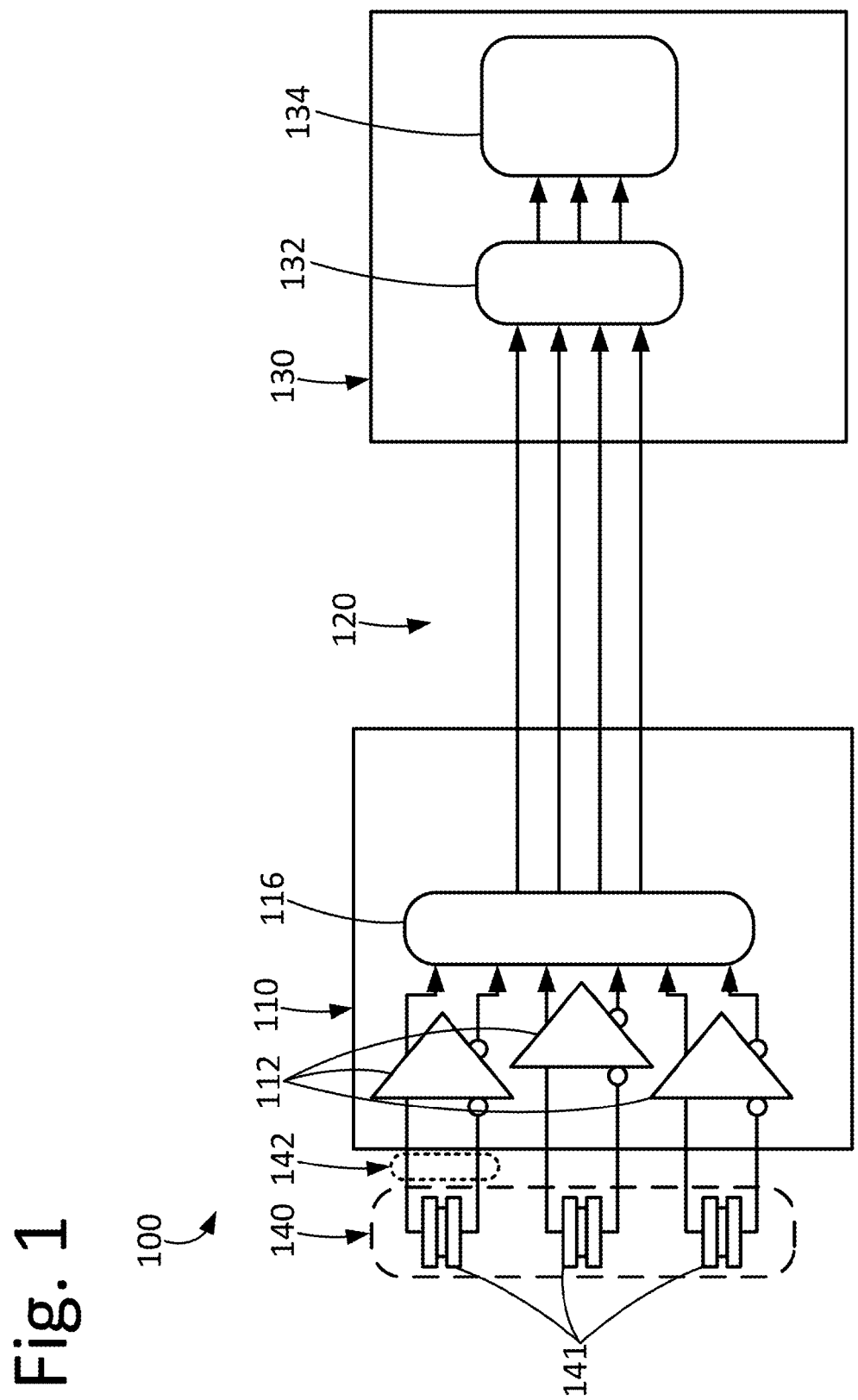
FIG. 1 is a schematic diagram of an exemplary apparatus for use in transmitting multiple differential signals.

Reading single tracks from a storage medium with an array of magneto-resistive (MR) read transducers, or readers, may be used to enhance, or improve, signal-to-noise ratios for data detection (e.g., for gains in areal density). For example, a data storage system may include three readers, and the three readers may be configured to read a single track (or multiple tracks in a different configuration) of data from a storage medium. The differential signal from each reader may be sensed by a preamplifier including three read amplifiers, each corresponding to one differential signal and one reader. In turn, the three amplifiers may drive three differential transmission, or read, signals, respectively, over a preamp-channel interface including a pair of conductors (e.g., on a flexible circuit, etc.) for each of three differential transmission signals to a multi-input read channel portion (e.g., a portion, or function, of a controller or system-on-chip (SOC)). Such configurations of the preamp channel interface including more than four conductors, or more than two channels, each including two conductors, electrically coupling a preamplifier to a read channel portion may increase cost, increase size, may increase interference between such conductors and others, may cause parasitic capacitance issues, and be challenging to design.

Conventional single-reader systems include a single read channel, the read channel including a pair of conductors, for transmission of a differential signal (e.g., a differential signal may be defined as two corresponding, or complementary, signals wherein information is contained in the difference between a characteristic, such as voltage, etc. between the two signals) from the preamplifier to the read channel portion for reading, and a single write channel, the write channel including a pair of conductors, for transmission of a differential write signal from a write channel portion to the preamplifier for writing. In other words, conventional single-reader systems include two channels, each including two conductors, electrically coupling the preamplifier and the read-write channel portion for transmission of read and write differential signals.

The exemplary apparatus, systems, and methods described herein for communication between the preamplifier and channel portion may be described as a different channel input architecture that may reduce the reader input pads capacitance which, in turn, may be beneficial to products with higher transfer rates. The present disclosure may generally be described as providing an increased number of read signals in a preamp-channel interface using the same number of channels, and in turn, conductors, as a conventional single-reader system. For example, it may be described that the exemplary systems, apparatus, and methods described herein provide a strategy to support a three-reader system with the same number of preamp-channel interface signals (e.g., over four wires) as a conventional single-read system. To provide such functionality, the exemplary systems, apparatus, and methods may include a "signal combiner" configured to combine three differential read signals (e.g., differential signals having a voltage difference such as differential signals from read transducers or readers) so that the three differential read signals can be sent differentially on four conductors, or wires, instead of six conductors, and a "signal separator" at the receiving end to separate the received signals back into the three original differential read signals (e.g., differential signals having a voltage difference). It may be described that reading with an array of read transducers provides gains in density and performance, but may burden a preamp-channel interface because of a need to accommodate parallel read signals. The exemplary systems, apparatus, and methods described herein include functionality, or a way, to send three differential read signals on four wires or conductors, e.g., so as to not burden a preamp-channel interface. When combined with a strategy of also using one pair of these wires when in write mode for the write signal, this exemplary interface may support a three-reader array with the same number of preamp-channel interface signals as used in single-reader configurations.

More specifically, the exemplary systems, apparatus, and methods include a way to differentially drive three or more separate differential read signals (e.g., differential signals having a voltage difference) onto four star terminated wires in a way that allows a receiver to separate and reconstruct the three original differential signals. Each of the three signals may be manifested as, or transformed into, two mirrored current sources having a total of four outputs, each signal using a different mapping of its two inverting and two non-inverting outputs to the four wires. Further, the currents from the different outputs driving the same resistively-terminated wire sum to a voltage, and the common mode current into the terminator is 0 for all signal combinations. The selective, or predetermined, mappings may be made such that three dual-differential receivers can isolate and reconstruct the three original source differential signals.

It is to be understood that the circuitry described herein is merely a single example, and that circuits and systems that are electrically different but mathematically similar (e.g., equivalent) are considered by the present disclosure. While the present disclosure is not so limited, an appreciation of various aspects of the disclosure will be gained through a discussion provided below.

Exemplary apparatus, systems, and methods shall be described with reference to FIGS. 1-9. It will be apparent to one skilled in the art that elements or processes from one embodiment may be used in combination with elements or processes of the other embodiments, and that the possible embodiments of such systems, methods, and devices using combinations of features set forth herein is not limited to the specific embodiments shown in the figures and/or described herein. Further, it will be recognized that timing of the processes and the size and shape of various elements herein may be modified but still fall within the scope of the present disclosure, although certain timings, one or more shapes and/or sizes, or types of elements, may be advantageous over others.

The exemplary apparatus, systems, and methods described herein may be part of, or used in conjunction with, a storage system, such as hard disk drive (HDD). For example, a storage system may be generally described as including a controller, a preamplifier, a flexible circuit and printed circuit board electrically coupling the controller to the preamplifier, a data communication component such as one or more heads (e.g., each head including an array, or plurality, of read transducers, etc.) to read and write data from a storage medium, and an interconnect portion electrically coupling data communication component to the preamplifier. Exemplary channel apparatus 100 that may be part, or used in conjunction, with a storage system is depicted in FIG. 1. As shown, the channel apparatus 100 includes a preamplifier 110, a plurality of conductors 120, a read channel portion 130, and a head 140.

The head 140 includes a plurality of read transducers 141. The read transducers 141 may be configured to read a single data track or multiple data tracks of a storage medium simultaneously or at the same time. Although not depicted, the head 140 may further include one or more write transducers to, e.g., write data to the storage medium. The plurality of read transducers 141 are each coupled to the preamplifier 110 with a pair of conductors 142 to provide a differential signal (e.g., a differential signal having a voltage difference) for reading data from a storage medium. Although the embodiment shown in FIG. 1 depicts three read transducers and associated pairs of conductors 142, it is to be understood that the exemplary channel apparatus 100 may include more than three read transducers such as, e.g., four or more read transducers, five or more read transducers, etc. In at least one embodiment, the pairs of conductors 142 may extend along an "arm" of a storage system from the head 140 to the preamplifier 110 to transmit the differential signals to the preamplifier 110. In some embodiments, the present invention may be used in a two dimension magnetic recording (TDMR) system or a multi signal magnetic recording (MSMR) system.

In at least another embodiment as shown in FIG. 10, the channel apparatus 102 may include a configuration in which each read transducer 141 shares a common shield (e.g., "shared shields") with another read transducer 141 such that, e.g., less than a pair of conductors 142 for each read transducer 141 may electrically couple the plurality of read transducers 141 to the preamplifier 110. In this configuration, some of signals (e.g., the shield signals) from the read transducers 141 may be coupled 143 before transmission to the preamplifier 110. Additionally, such signals may then be split 145 at the preamplifier 145 to, e.g., provide the differential signals to the dual trans conductance amplifiers 112 as described further herein. As such, in the depicted embodiment, only four conductors may be used to electrically couple to the head 140 including three read transducers 141 to the preamplifier 110.

The preamplifier 110 may be generally described as being configured to receive the differential signals from the read transducers 141 and amplify the differential signals for transmission to the read channel portion 130. In the exemplary systems and apparatus, the preamplifier 110 is further configured to receive the three differential signals from the read transducers 141 and generate a plurality transmission signals such as, e.g., four transmission signals as shown, for transmission over a plurality of conductors such as, e.g., four conductors as shown, between the preamplifier 110 and the read channel portion 130 based on the three differential signals. Although the embodiments described herein generally use three differential signals (e.g., from three read transducers 141), four transmission signals, and four conductors 120, it is to be understood that the same or similar exemplary apparatus, systems, and methods described herein may be applied to more than three differential signals, which in turn, may then use more than four transmission signals and conductors. Further, it may be described that the number, or amount, of transmission signals that the preamplifier 110 is configured to generate will match, or be less, than the amount of conductors 120 electrically coupling (e.g., extending between, on a flexible circuit, etc.) the preamplifier 110 and the read channel portion 130 (e.g., if the plurality of conductors consists of four conductors, the number, or amount, of transmission signals generated by the preamplifier 110 may be four or less, if the plurality of conductors consists of six conductors, the number, or amount, of transmission signals generated by the preamplifier 110 may be six or less, etc.). Still further, the number of transmission signals generated by the preamplifier 110 may be described as being less than twice the number of differential signals provided by the read transducers 141 (e.g., if three differential signals are provided by the read transducers 141, the number of transmission signals may be less than six, if four differential signals are provided by the read transducers 141, the number of transmission signals may be less than eight, etc.).

As noted, three read transducers 141 are depicted in this embodiment, and thus, three differential signals (e.g., differential signals having a voltage difference) are provided to the preamplifier 110 over three pairs of conductors 142. Each of the three differential signals includes a pair of signals (e.g., each pair of signals may be described as two corresponding, or complementary, signals wherein information is contained in the difference between a characteristic, such as voltage, etc. between the two signals), each signal being transmitted on each conductor, and thus, the preamplifier 110 receives a total of six signals. In this example, the preamplifier 110 is configured to generate four transmission signals to be transmitted over four conductors 120 to the read channel portion 130 based on the total of six received signals from the read transducers 141.

To generate the plurality of transmission signals, the preamplifier 110 may be described as being configured to extract, or generate, intermediate signal(s) representative each of the differential signals and then to combine such intermediate signals representative of the three differential signals to provide the plurality of transmission signals (e.g., such that three differential signals are capable of being used to extracted, or separated, from the plurality of transmission signals). In other words, each of the plurality of transmission signals generated by and provided by the preamplifier 110 may be described as including intermediate signals representative of each of the differential signals from the read transducers 141. In some embodiments, the differential signals are subjected to an orthogonal pairing process.

In at least one embodiment, the preamplifier 110 may be configured to convert a differential voltage, or voltage difference, of each differential signal to a pair of intermediate signals defining, or having, a current proportional to the differential voltage, and then combine the current proportional, intermediate signals according to a pre-determined, or selected, pattern, scheme, or mapping. To do so, the preamplifier 110 may include a plurality of dual transconductance amplifiers 112 such as, e.g., three dual transconductance amplifiers 112 as shown. Each of the dual transconductance amplifiers 112 may be configured to receive as input the differential voltage, or voltage difference, of the differential signal sensed from a read transducer 141 and may output a result in a proportional current drive as intermediate signal on each of two current-mode outputs.

Figure 2:
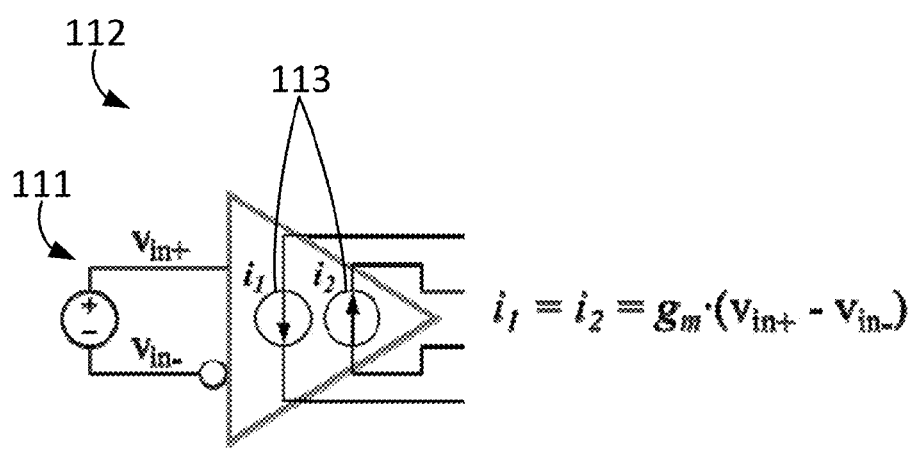
FIG. 2 is a circuit diagram of an exemplary dual transconductance amplifier for use in the preamplifier of FIG. 1.

An exemplary dual transconductance amplifier 112 is depicted in more detail FIG. 2. As shown, a differential voltage 111 from a differential signal may be applied to the inputs of the dual transconductance amplifier 112, and the dual transconductance amplifier 112 may output a pair of intermediate signals 113 having currents, $i_1$ and $i_2$, each equal to the voltage difference multiplied by the sum gain of the amplifier 112 (e.g., $i_1=i_2=g_m*(v_{in+}-v_{in-})$). In other words, each dual transconductance amplifier 112 may generate a first and second intermediate, or output, signals 113 (e.g., each of the intermediate, or output, signals having a positive and a negative side), each intermediate, or output, signal defining a proportional current based on the differential voltage 111 of the differential signal from the read transducer 141.

The pair of intermediate signals 113 may then be provided to a signal combiner, or summer, 116 of the preamplifier 110 as shown in FIG. 1 to selectively combine an intermediate output signal 113 from each of the three dual transconductance amplifiers 112 to generate each of the four transmission signals to be transmitted via the four conductors 120 to the read channel portion 130. The signal combiner 116 of the preamplifier 110 may be described as "selectively" combining the intermediate signals 113 from all of the dual transconductance amplifiers 112 to provide each of the transmission signals because the combination, pattern, scheme, or mapping, by which the intermediate signals are combined, or summed, may be selected, or predetermined, such that read channel portion 130 can separate, decode, and/or use the transmission signals to generate the original differential signals (e.g., differential signals having a voltage difference) based on the selected, or predetermined, combination, pattern, scheme, or mapping.

Figure 3:
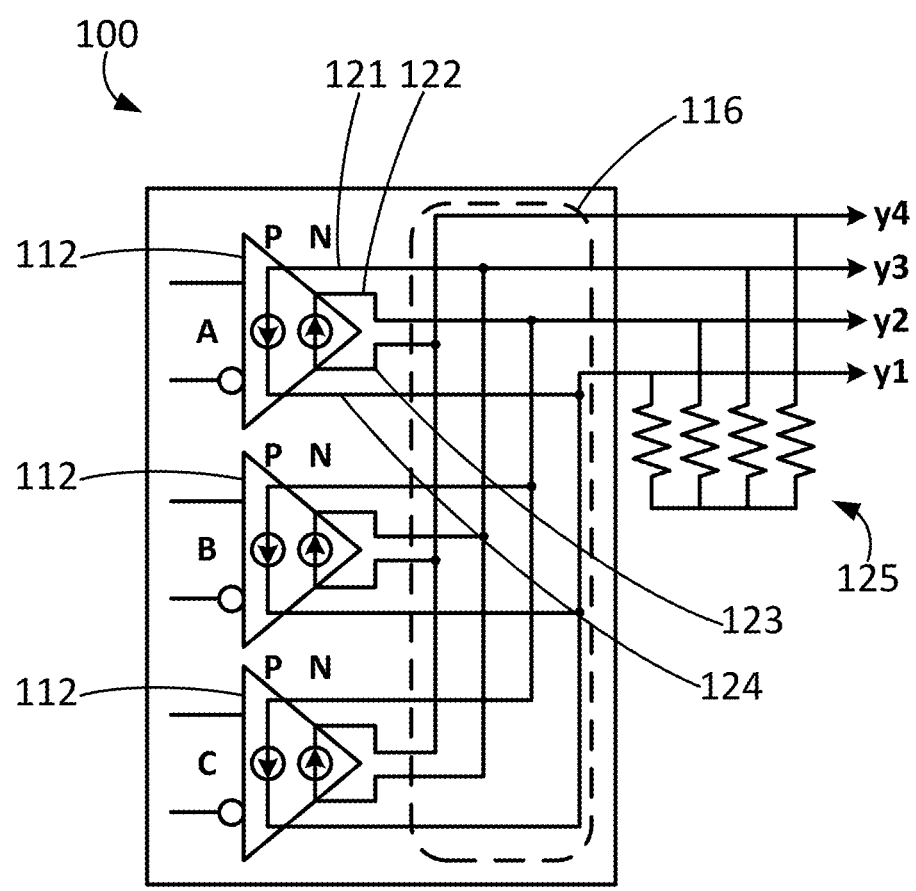
FIG. 3 is a schematic diagram of an exemplary preamplifier of the apparatus of FIG. 1.
Figure 4:
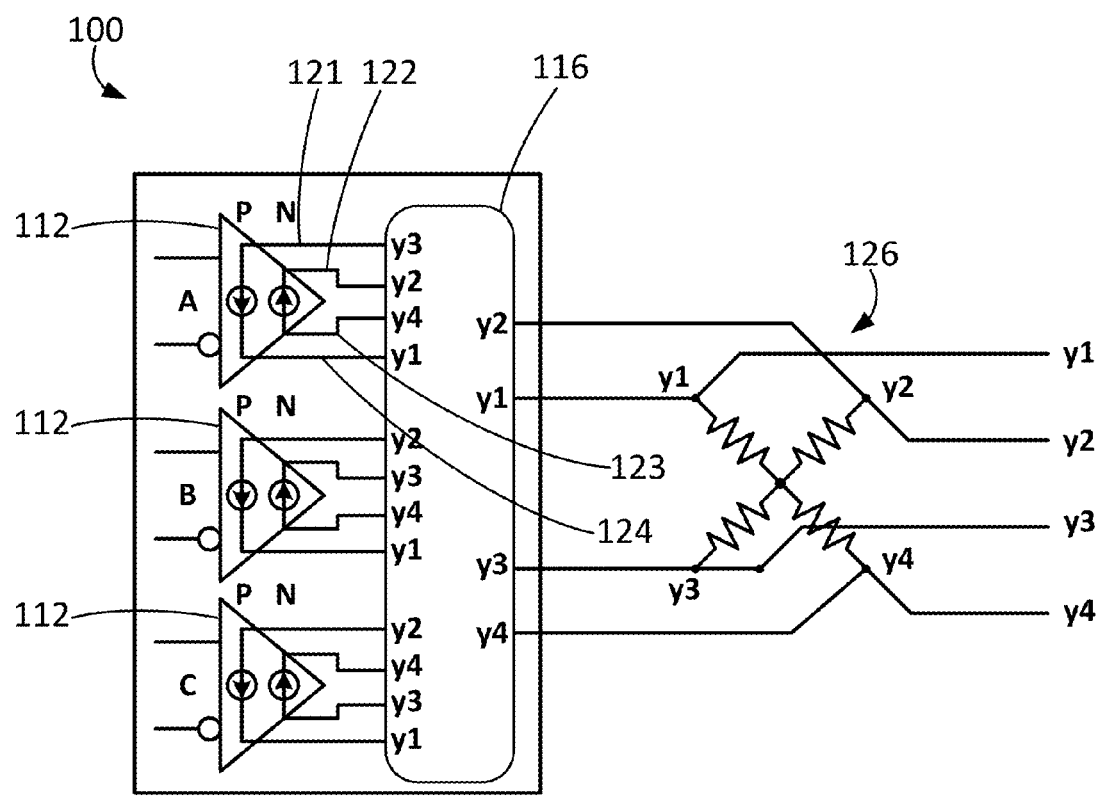
FIG. 4 is another schematic diagram of the preamplifier of FIG. 3.

For example, an exemplary selected, or predetermined, combination is depicted in FIGS. 3-4. As shown, a differential signal A is applied to a first dual transconductance amplifier 112, a differential signal B is applied to a second dual transconductance amplifier 112, and a differential signal C is applied to a third dual transconductance amplifier 112. Each of the dual transconductance amplifiers 112 may be described as outputting, or providing, a first signal 121 (e.g., negative side of $i_1$), a second signal 122 (e.g., positive side of $i_2$), a third signal 123 (e.g., negative side of $i_2$), and a fourth signal 124 (e.g., positive side of $i_1$). Each of the first, second, third, and fourth signals 121, 122, 123, 124 are representative of the differential voltage of the differential signal input to the dual transconductance amplifier 112. For example, each of the first, second, third, and fourth signals 121, 122, 123, 124 may define current proportional to the voltage difference of the differential signal applied to the dual transconductance amplifier 112.

In this embodiment (e.g., according to an exemplary mapping, scheme, etc.), the first signal 121 of the "A" dual transconductance amplifier 112 is combined with the second signal 122 of the "B" dual transconductance amplifier 112 and the third signal 123 of the "C" dual transconductance amplifier 112 to provide transmission signal y3. The second signal 122 of the "A" dual transconductance amplifier 112 is combined with the first signal 121 of the "B" dual transconductance amplifier 112 and the first signal 121 of the "C" dual transconductance amplifier 112 to provide transmission signal y2. The third signal 123 of the "A" dual transconductance amplifier 112 is combined with the third signal 123 of the "B" dual transconductance amplifier 112 and the second signal 122 of the "C" dual transconductance amplifier 112 to provide transmission signal y4. Lastly, the fourth signal 124 of the "A" dual transconductance amplifier 112 is combined with the fourth signal 124 of the "B" dual transconductance amplifier 112 and the fourth signal 124 of the "C" dual transconductance amplifier 112 to provide transmission signal y1. Thus, each of the transmission signals y1, y2, y3, y4 may be described as being a combination, or summation, selected signals representative of the differential voltage of the differential signal A, a selected signal representative of the differential voltage of the differential signal B, and a selected signal representative of the differential voltage of the differential signal C. Further, each of the transmission signals y1, y2, y3, and y4, or the four outputs of three dual transconductance amplifiers 112, are each tied to one of four nodes of a resistive termination network 125 that could be either a star or delta configuration. The currents of the transmission signals y1, y2, y3, and y4, sum to create four voltage outputs, which may facilitate implementation for the common mode of the signal path between the preamplifier 110 and the read channel portion 130.

An alternate illustration of this selected, or predetermined, combination, or summation, is depicted further down in FIG. 4. As shown, various dual transconductance amplifier outputs are mapped to a star termination 126, where each of the yN inputs driven from an amplifier output is tied to a corresponding yN output which goes to a node of the star terminator, and ultimately to a multi-input read channel.

A matrix notation of the exemplary selected, or predetermined, combination or connection scheme is depicted below.

$$\begin{bmatrix} y1 & y2 \\ y3 & y4 \end{bmatrix} \begin{bmatrix} + & + \\ - & - \end{bmatrix}^A \begin{bmatrix} + & - \\ + & - \end{bmatrix}^B \begin{bmatrix} + & - \\ - & + \end{bmatrix}^C$$

As shown in the matrix notation, the dual transconductance amplifier "A" drives the top two and bottom two nodes of the star termination differentially, the dual transconductance amplifier "B" drives the left two and the right two nodes differentially, and the dual transconductance amplifier "C" drives the diagonal nodes differentially. The summing of the three differential source signals into the four yN outputs is shown in matrix form below.

$$\begin{bmatrix} 1 & 1 & 1 \\ 1 & -1 & -1 \\ -1 & 1 & -1 \\ -1 & -1 & 1 \end{bmatrix} \times \begin{bmatrix} A \\ B \\ C \end{bmatrix} = \begin{bmatrix} A+B+C \\ A-B-C \\ -A+B-C \\ -A-B+C \end{bmatrix} = \begin{bmatrix} y1 \\ y2 \\ y3 \\ y4 \end{bmatrix}$$

Note that since the sum of the third matrix (i.e., third matrix from the left) is 0 for any values of A, B, and C, the common mode current into the star termination is 0 for any combination of signal levels A, B, and C.

The plurality of transmission signals such as, e.g., y1, y2, y3, y4, may be received by a read channel portion 130 as shown in FIG. 1. Generally, the read channel portion 130 may be described as being configured to receive the plurality of transmission signals over the plurality of conductors 120 and generate the source, or original, differential signals based on the plurality of transmission signals. The read channel portion 130 may be described as a part, portion, or function of a controller (e.g., a SOC) of a storage system. The read channel portion 130 may further be referred to as a read-write channel portion, e.g., when such portion also includes circuitry and apparatus to transmit write signals over the plurality of conductors 120 to the preamplifier 110 for writing one or more data tracks on a storage medium using a head 140.

To generate the original, or source, differential signals based on the transmission signals received over the plurality of conductors 120, the read channel portion 130 may include a signal separator, or separator portion, 132 that is configured to decode, or extract, the differential signals from the transmission signals. Once the differential signals are generated by the signal separator 132, the differential signals may be transmitted, or forwarded on, to a multi-input analog front end portion 134 and to any other portion of a storage system for appropriate decoding, error correction, etc.

Figure 5:
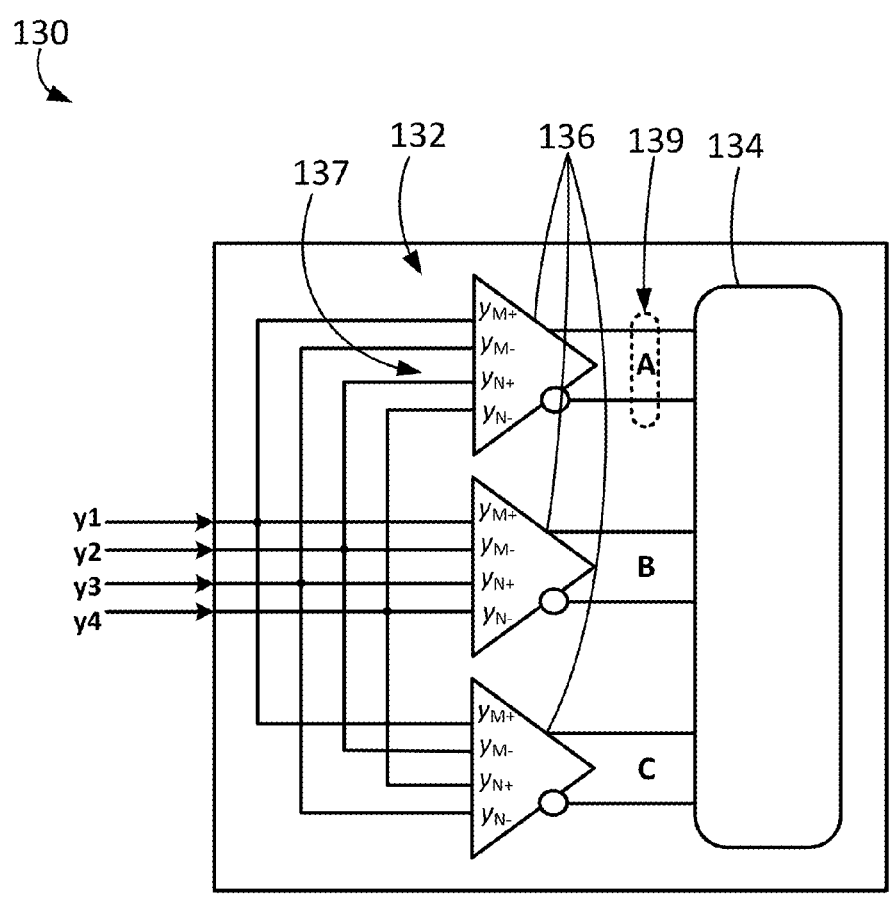
FIG. 5 is a schematic diagram of an exemplary read channel portion of the apparatus of FIG. 1.
Figure 6:
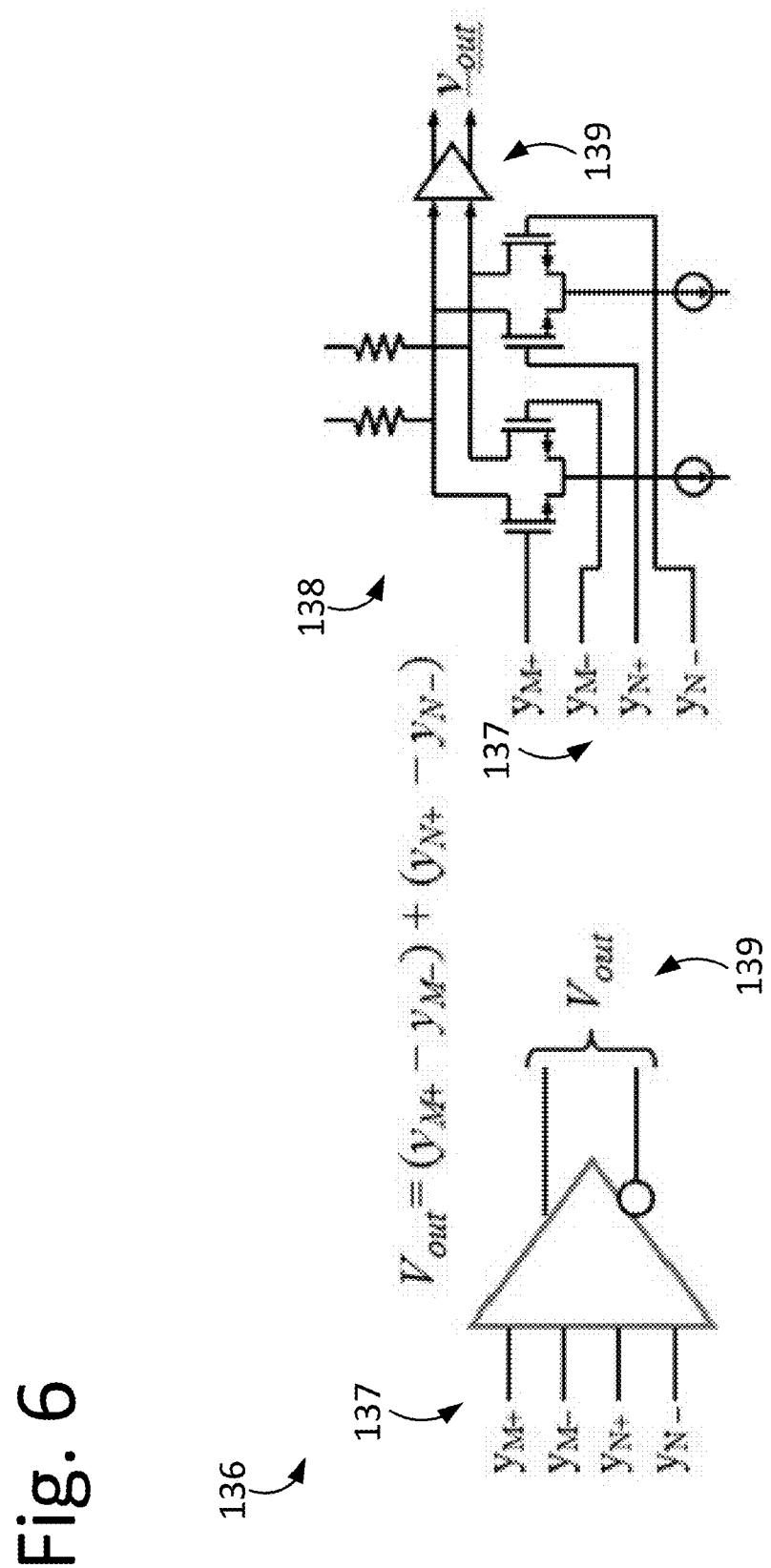
FIG. 6 are circuit diagrams of an exemplary dual differential receiver amplifier for use in the read channel apparatus of FIG. 5.

In at least one embodiment, to generate the differential signals from the transmission signals, the read channel portion 130 may include three dual differential receiver amplifiers 136 such as, e.g., three dual differential receiver amplifiers 136 as shown in FIG. 5. Each dual differential receiver amplifier 136 may include four inputs, each input electrically coupled to one of the plurality of conductors 120, and thus, each dual differential amplifier 136 may be configured to receive each of the plurality of transmission signals. As depicted, each dual differential receiver amplifier 136 receives each of transmission signals y1, y2, y3, y4.

Further, each dual differential receiver amplifier 136 may be generally described as being configured to extract one of the three differential signals from the plurality of transmission signals based on the selected, or predetermined, combination/scheme/mapping that the plurality of transmissions signals were generated thereby. For example, each dual differential receiver amplifier 136 may sum, or combine, the transmission signals according to a selected, or predetermined, combination/scheme/mapping to provide the original differential signals.

As shown in FIG. 5, each of the transmission signals y1, y2, y3, y4 is coupled to each of the inputs 137 and a differential voltage 139 is output from the dual differential receiver amplifier 136. An exemplary dual differential receiver amplifier 136 and a circuit diagram 138 thereof is depicted in more detail FIG. 6. As shown, the dual differential receiver amplifier 136 receives transmission signals at inputs $y_{M+}$, $y_{M-}$, $y_{N+}$, $y_{N-}$ 137 and outputs a differential voltage 139, $V_{out}$, which is may be represented by $V_{out} = (y_{M+} - y_{M-}) + (y_{N+} - y_{N-})$. Each dual differential receiver amplifier 136 may be configured to generate, or extract, one of the original differential signals from the transmission signals y1, y2, y3, y4, respectively, depending on how the inputs 137 are coupled to the plurality of conductors 120, and thus, the transmission signals y1, y2, y3, y4.

In other words, the summing of the three dual transconductance amplifiers 112 into the four $y_N$ nodes, and consequently, through the four conductors, or interconnect traces, between the preamplifier 110 and read channel portion 130 (e.g., a portion of a SOC) enables three dual-differential amplifiers 136 at the receiving end to separate and reconstruct the three source differential signals from their composite form on the four conductors 120 of the preamp-to-channel interface.

As described, the scheme, combination, or mapping of the transmission signals y1, y2, y3, y4 to the inputs 137 of the plurality of dual differential receiver amplifiers 136 may determine which of the original differential signals are generated. An exemplary selected, or predetermined, combination, scheme, or mapping, of the four transmission signals into the separator portion 132, and thus, the dual differential receiver amplifiers 136 is depicted in FIG. 5. As shown in this embodiment, transmission signal y1 is transmitted to the $y_{M+}$ input of the "A" dual differential receiver amplifier 136, the $y_{M+}$ input of the "B" dual differential receiver amplifier 136, and the $y_{M+}$ input of the "C" dual differential receiver amplifier 136. Further, transmission signal y2 is transmitted to the $y_{N+}$ input of the "A" dual differential receiver amplifier 136, the $y_{M-}$ input of the "B" dual differential receiver amplifier 136, and the $y_{M-}$ input of the "C" dual differential receiver amplifier 136. Still further, transmission signal y3 is transmitted to the $y_{M-}$ input of the "A" dual differential receiver amplifier 136, the $y_{N+}$ input of the "B" dual differential receiver amplifier 136, and the $y_{N-}$ input of the "C" dual differential receiver amplifier 136. Lastly, transmission signal y4 is transmitted to the $y_{N-}$ input of the "A" dual differential receiver amplifier 136, the $y_{N-}$ input of the "B" dual differential receiver amplifier 136, and the $y_{N+}$ input of the "C" dual differential receiver amplifier 136. With this combination or mapping of the $y_N$ signal to the dual differential receiver amplifier 136 inputs, the signal-summing and signal-differencing implemented by the dual differential receiver amplifiers 136 are configured to extracts the three original read differential signals A, B, C from the four $y_N$ signals.

The connectivity shown in FIG. 5 may be represented in the matrix equations below.

$$\begin{bmatrix} 1 & 1 & -1 & -1 \\ 1 & -1 & 1 & -1 \\ 1 & -1 & -1 & 1 \end{bmatrix} \begin{bmatrix} y1 \\ y2 \\ y3 \\ y4 \end{bmatrix} =$$

$$\begin{bmatrix} (A+B+C)+(A-B-C)-(-A+B-C)-(-A-B+C) \\ (A+B+C)-(A-B-C)+(-A+B-C)-(-A-B+C) \\ (A+B+C)-(A-B-C)-(-A+B-C)+(-A-B+C) \end{bmatrix} = \begin{bmatrix} 4A \\ 4B \\ 4C \end{bmatrix}$$

Each of the three rows of the leftmost matrix corresponds to the connections of the four $y_N$ signals to the corresponding dual differential receiver amplifiers 136 with the 1 and −1 entries indicating whether the corresponding $y_N$ signal is connected to a non-inverting or inverting input. Further, each row of the matrix to the right of the leftmost matrix equals sign shows the source differential signal composites summed by the combination of $y_N$ signals input to the corresponding dual differential receiver amplifier 136. The rightmost matrix is the algebraic reduction of these combinations, illustrating that the three source differential signals A, B, C are extracted and isolated by this dual differential receiver amplifier functionality. It is to be understood by those skilled in the field that the terms included in the rightmost matrix may not need to be exactly four times the magnitude of the corresponding input signals, but just proportional with said input signals magnitude, based on the gain factors in the entire signal path.

Figure 7:
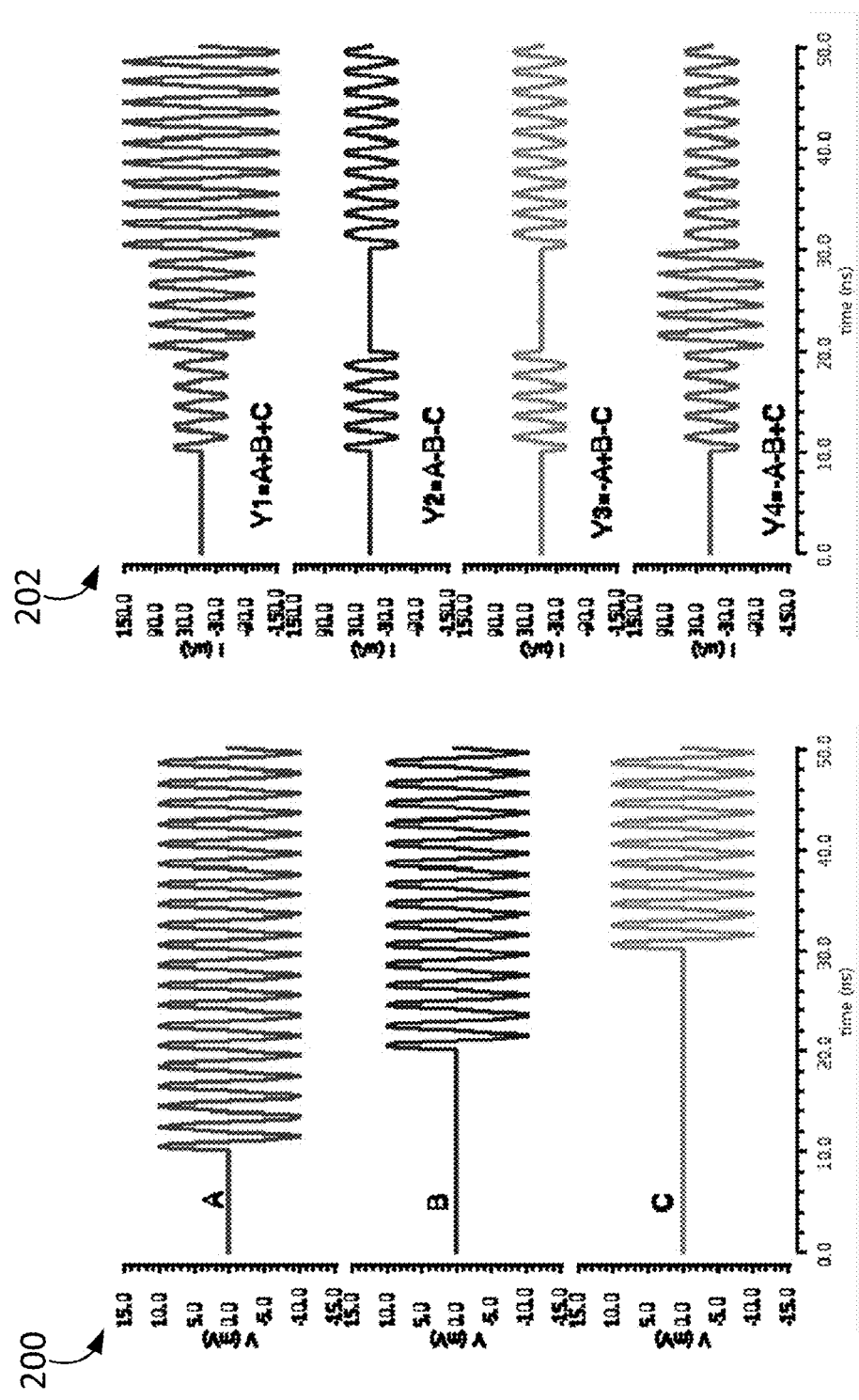
FIG. 7 are graphs depicting three differential signals and four transmission signals generated by a simulated exemplary preamplifier of FIGS. 1-4.

Graphs depicting three differential signals 200 (e.g., the voltage difference of the differential signal) and four transmission signals 202 generated by a simulated exemplary preamplifier as described herein with respect to FIGS. 1-4 is depicted in FIG. 7. As shown, transmission signal Y1 is the sum of all three differential signals A, B, C, transmission signal Y2 is the difference of differential signals B and C from the differential signal A, transmission signal Y3 is the difference of differential signals A and C from the differential signal B, and transmission signal Y4 is the difference of differential signals A and B from the differential signal C.

Figure 8:
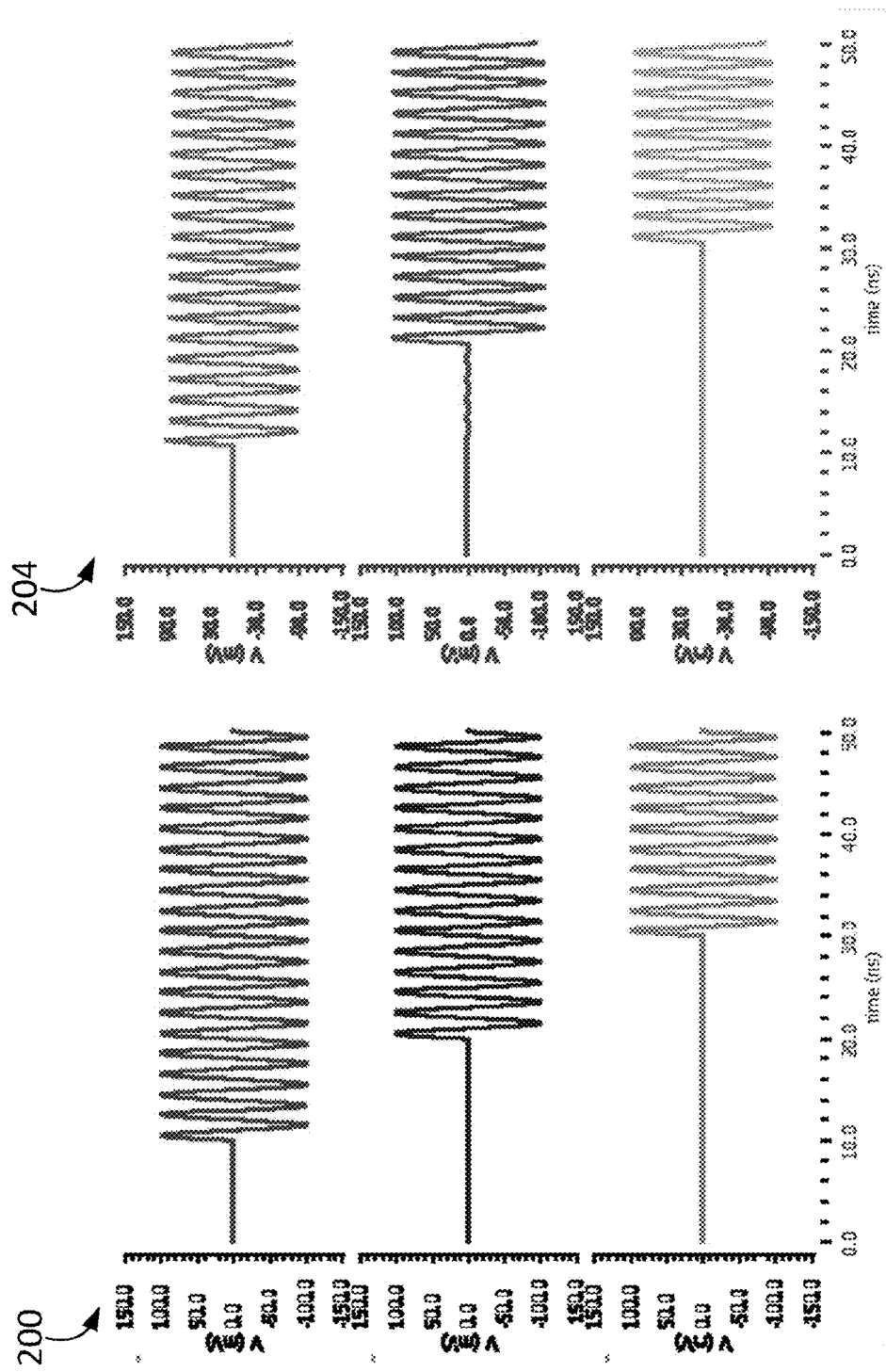
FIG. 8 are graphs depicting three differential signals generated by a simulated exemplary read channel portion of FIG. 5 using the four transmission signals of FIG. 7 and the three original differential signals of FIG. 7 for comparison.

FIG. 8 includes graphs depicting three differential signals 204 generated by a simulated exemplary read channel portion of FIG. 5 using the four transmission signals 202 of FIG. 7. Further, the three original differential signals 200 are depicted in FIG. 8 for comparison. As shown, the three generated differential signals 204 closely match the original three differential signals 200.

It would also be understood by those skilled that a termination network could either be implemented in a pre-amplifier output driver, in the channel input receiver, both in the preamplifier output driver and in the channel input receiver, or in discrete resistors external to one or both of the preamplifier output driver and the channel input receiver depending, for example, on the objectives and constraints of the signal path between the two devices. In practice, the fidelity of the three reconstructed signals at the SOC may be impaired by the proper termination by, e.g., the characteristics of the signal path between preamplifier and SOC, the matching of summing gains in the receiver circuits, the common mode rejection and coupling artifacts in the signal path, etc. However, an array reader system may need to cope with coupling between the A, B, and C signals occurring at their sources in the slider, and the coupling impairments that may be created by the exemplary systems, apparatus, and methods described herein are expected to be small relative to the any other more dominant sources of coupling that may be inherent to an array-reader configuration. Further, it may also be reasonable to expect that the impact from a less than ideal reconstruction at a receiver end could be mitigated by the same channel blocks that are designed to remove a cross-coupling between the source signals at the slider.

Figure 9:
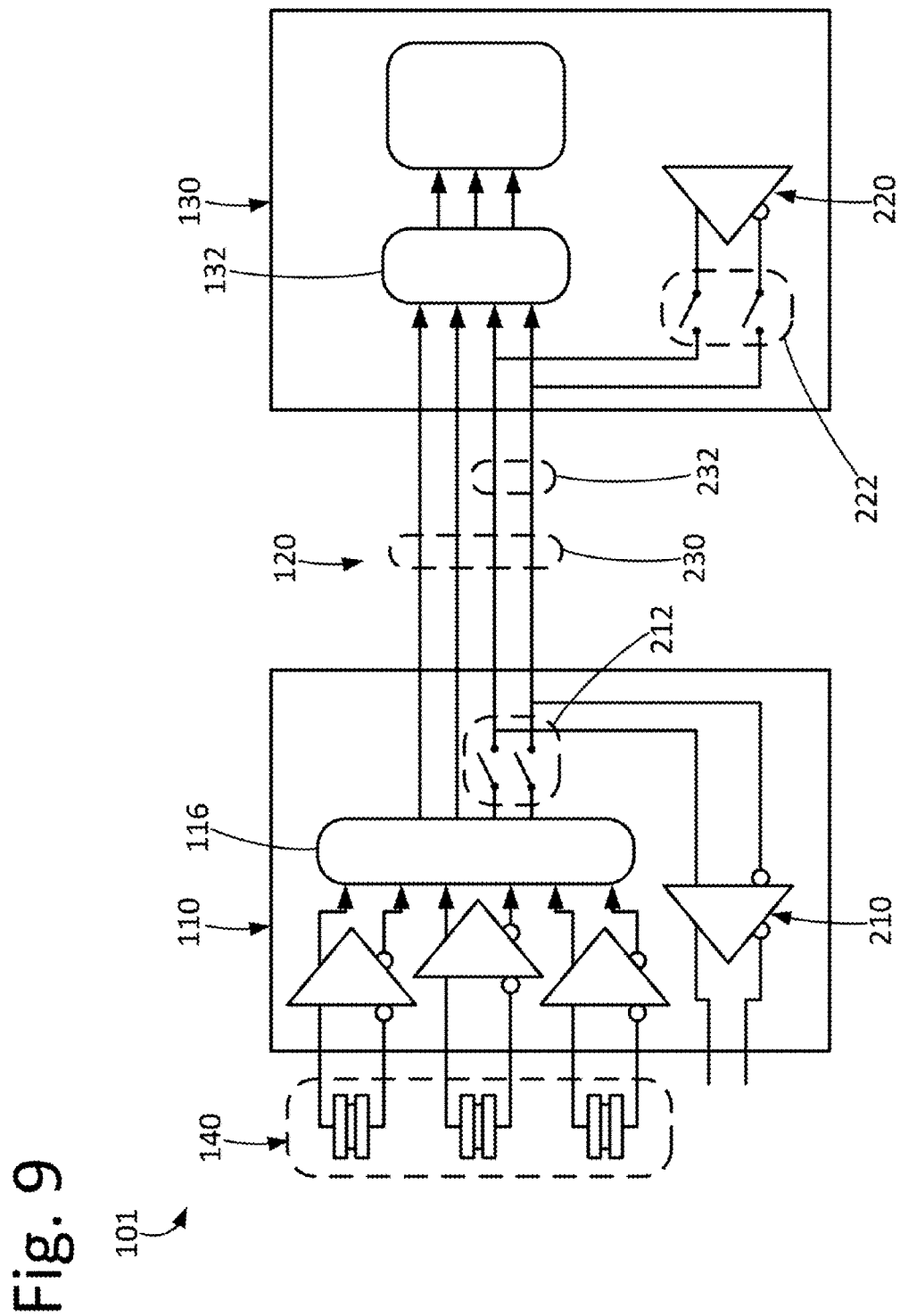
FIG. 9 is a schematic diagram of another exemplary apparatus for use in transmitting multiple differential signals using a write data path in conjunction with read data path.

A schematic diagram of another exemplary channel apparatus 101 for use in transmitting multiple differential signals using a write data path in conjunction with read data path is depicted in FIG. 9. Similar to the channel apparatus 100 of FIG. 1, the channel apparatus 101 includes a head (e.g., including a plurality of read transducers, a write transducer, etc.), a preamplifier 110, a plurality of conductors 120, and read channel portion 130. In this embodiment, each of the preamplifier 110 and the read channel portion 130 includes write apparatus, namely, a write amplifier 210 in the preamplifier 110 electrically coupled via a pair of the conductors 120 to a write signal output 220 of the read channel portion 130 (which, thus, may be referred to as a read-write channel portion 130). The pair of conductors 120 used by the write apparatus may be referred to as the write channel 232.

As described herein, the exemplary apparatus, systems, and methods may use four conductors 120 to transmit the transmission signals, and thus, may want to utilize all conductors 230 of the plurality of conductors 120 (e.g., including the write channel 232). Thus, each of the preamplifier 110 and the read-write channel portion 130 may include switching apparatus 212, 222, respectively, configured to allow the transmission signals to be transmitted using all conductors 230 of the plurality of conductors 120. For example, when the write channel 232 is not in use (e.g., not being used for the transmission of write signals between the write signal output 220 and the write amplifier 210), the write channel 232 may be switched to be used with the exemplary read signal transmission apparatus (e.g., electrically coupling to the signal combiner 116 and signal separator 132). Likewise, when the write channel 232 is in use (e.g., being used for the transmission of write signals between the write signal output 220 and the write amplifier 210), the write channel 232 may be switched to be used with the exemplary write signal transmission apparatus (e.g., electrically coupling to the write signal output 220 and the write amplifier 210). In this embodiment, no additional conductors may need to be designed and added to an interface between preamplifier 110 and the read-write channel portion 130 that includes four conductors.

The methods and/or techniques described in this disclosure, including those attributed to the HDD controller, or various constituent components, may be implemented, at least in part, in hardware, software, firmware, or any combination thereof. For example, various aspects of the techniques may be implemented within one or more processors, including one or more microprocessors, DSPs, ASICs, FPGAs, or any other equivalent integrated or discrete logic circuitry, as well as any combinations of such components, embodied in programmers, such as physician or patient programmers, stimulators, image processing devices, or other devices. The term "controller," "module," "processor," or "processing circuitry" may generally refer to any of the foregoing logic circuitry, alone or in combination with other logic circuitry, or any other equivalent circuitry.

Such hardware, software, and/or firmware may be implemented within the same device or within separate devices to support the various operations and functions described in this disclosure. In addition, any of the described units, modules, or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

When implemented in software, the functionality ascribed to the systems, devices and techniques described in this disclosure may be embodied as instructions on a computer-readable medium such as RAM, ROM, NVRAM, EEPROM, FLASH memory, STRAM, RRAM, magnetic data storage media, optical data storage media, or the like. The instructions may be executed by one or more processors to support one or more aspects of the functionality described in this disclosure.

In the preceding description, reference is made to the accompanying set of drawings that form a part hereof and in which are shown by way of illustration several specific embodiments. It is to be understood that other embodiments are contemplated and may be made without departing from (e.g., still falling within) the scope or spirit of the present disclosure. The preceding detailed description, therefore, is not to be taken in a limiting sense. The definitions provided herein are to facilitate understanding of certain terms used frequently herein and are not meant to limit the scope of the present disclosure.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a", "an", and "the" encompass embodiments having plural referents, unless the content clearly dictates otherwise. As used in this specification and the appended claims, the term "or" is generally employed in its sense including "and/or" unless the content clearly dictates otherwise.

It is noted that terms such as "top", "bottom", "above, "below", etc. may be used in this disclosure. These terms should not be construed as limiting the position or orientation of a structure, but should be used as providing spatial relationship between the structures.

Embodiments of the systems, apparatus, and methods for measuring latency in a storage device are disclosed. The implementations described above and other implementations are within the scope of the following claims. One skilled in the art will appreciate that the present disclosure can be practiced with embodiments other than those disclosed. The disclosed embodiments are presented for purposes of illustration and not limitation, and the present invention is limited only by the claims that follow.

What is claimed is:

1. An apparatus comprising:
 a preamplifier configured to generate a plurality of transmission signals for transmission over a plurality of conductors based on at least three differential signals, each transmission signal comprising a signal representative of each of the differential signals; and
 a read channel portion configured to receive the transmission signals over the conductors and generate the differential signals based on the transmission signals.

2. The apparatus of claim 1, wherein the plurality of transmission signals consists of four transmission signals and the plurality of conductors consists of four conductors.

3. The apparatus of claim 1, wherein a total number of the transmissions signals is less than twice a total number of the differential signals.

4. The apparatus of claim 1, wherein the preamplifier comprises at least three dual transconductance amplifiers, each dual transconductance amplifier configured to receive one differential signal of the differential signals and to generate a first and second intermediate signals each defining a current proportional to the voltage difference of the differential signal, wherein the preamplifier is configured to selectively combine one of the first and second intermediate signals from each of the dual transconductance amplifiers to generate each of the transmission signals.

5. The apparatus of claim 1, wherein the read channel portion comprises at least three dual differential receiver amplifiers, each dual differential receiver amplifier configured to receive the transmission signals and to extract one of the three differential signals based on all of the transmission signals.

6. The apparatus of claim 1, wherein a pair of the plurality of conductors defines a write data path configured to transmit write signals to the preamplifier, wherein the preamplifier is further configured to use the write data path to transmit the transmission signals to the read channel portion when the write data path is not used for transmission of write signals.

7. The apparatus of claim 1, further comprising a head comprising at least three read transducers configured to read data from at least one track of a storage medium, each read transducer electrically coupled to the preamplifier to provide one of the differential signals.

8. The apparatus of claim 1, further comprising a head comprising at least three read transducers electrically coupled to the preamplifier, each of the at least three read transducers sharing a common shield with another of the read transducers, each of the differential signals comprising a signal from a common shield.

9. A method comprising:
  generating a plurality of transmission signals for transmission over a plurality of conductors based on at least three differential signals, each of the plurality of transmission signals comprising a signal representative of each of the at least three differential signals;
  receiving the transmission signals over the conductors; and
  generating the differential signals based on the transmission signals.

10. The method of claim 9, wherein the plurality of transmission signals consists of four transmission signals and the plurality of conductors consists of four conductors.

11. The method of claim 9, wherein a total number of transmission signals is less than twice a total number of differential signals.

12. The method of claim 9, wherein generating a plurality of transmission signals for transmission over a plurality of conductors based on at least three differential signals comprises:
  generating, for each of the differential signals, a first and second intermediate signals, each defining a current proportional to the voltage difference of the differential signal, and
  selectively combining one of the first and second intermediate signals from each of the differential signals to generate each of the transmission signals.

13. The method of claim 9, wherein generating the at least three differential signals based on the plurality of transmission signals comprises extracting each one of the differential signals based on all of the transmission signals.

14. The method of claim 9, wherein a pair of the plurality of conductors defines a write data path configured to transmit write signals, wherein the method further comprises using the write data path to transmit the transmission signals to the read channel portion when the write data path is not used for transmission of write signals.

15. The method of claim 9, the method further comprising reading at least one track of a storage medium using at least three read transducers to provide each of the differential signals.

16. A system comprising:
  a preamplifier configured to:
    receive three differential signals,
    generate intermediate signals for each of the three differential signals, each intermediate signal defining a current proportional to the voltage difference of the differential signal, and
    selectively combine the intermediate signals to generate four transmission signals for transmission over four conductors, each of the plurality of transmission signals comprising a signal representative of each of the three differential signals.

17. The system of claim 16, wherein the preamplifier comprises three dual transconductance amplifiers, each dual transconductance amplifier configured to receive one differential signal of the three differential signals and to generate at least two intermediate signals, each of the at least two intermediate signals defining a current proportional to the voltage difference of the differential signal.

18. The system of claim 16, further comprising a read channel portion configured to receive the four transmission signals over the four conductors and generate the three differential signals based on the four transmission signals.

19. The system of claim 18, wherein the read channel portion comprises three dual differential receiver amplifiers, each dual differential receiver amplifier configured to receive each of the four transmission signals and to extract one of the three differential signals based on all of the four transmission signals.

20. The system of claim 16, wherein a pair of the plurality of conductors defines a write data path configured to transmit write signals to the preamplifier, wherein the preamplifier is further configured to use the write data path to transmit the transmission signals when the write data path is not used for transmission of write signals.

* * * * *